O. P. PELLNITZ.
PROCESS OF PURIFYING PINE OIL, PINE TAR OIL, AND WOOD TAR OIL.
APPLICATION FILED JUNE 6, 1907.
910,146.  Patented Jan. 19, 1909.
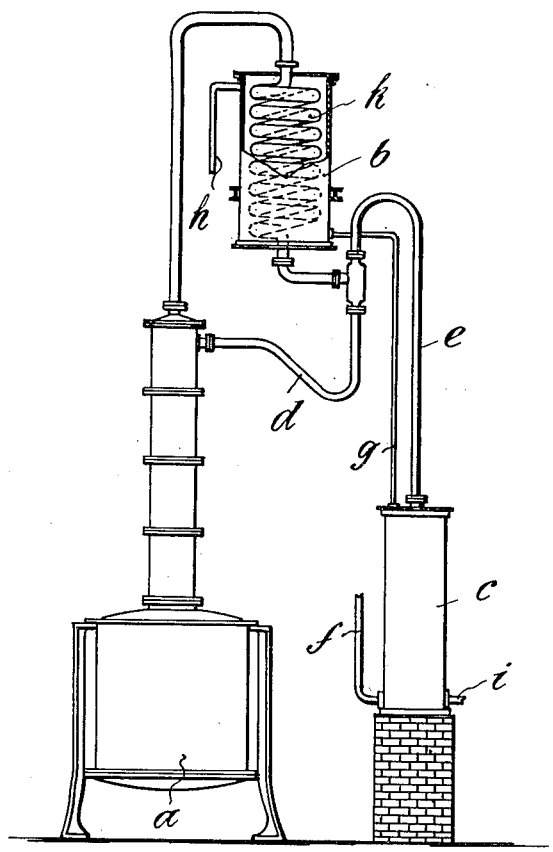

UNITED STATES PATENT OFFICE.

OTTO PAUL PELLNITZ, OF DELMENHORST, GERMANY.

PROCESS OF PURIFYING PINE-OIL, PINE-TAR OIL, AND WOOD-TAR OIL.

No. 910,146. Specification of Letters Patent. Patented Jan. 19, 1909.

Application filed June 6, 1907. Serial No. 377,518.

*To all whom it may concern:*

Be it known that I, OTTO PAUL PELLNITZ, a subject of the Emperor of Germany, resident of Delmenhorst, Oldenburg, Germany, Hasbergerstrasse, have invented a new and useful Process of Purifying Pine-Oil, Pine-Tar Oil, and Wood-Tar Oil.

Pine-oil, pine-tar-oil and wood-tar-oil become changed, in consequence of the high temperature required for the dry distillation of the wood, by oxidations, condensations, polymerizations and so on, and polluted by the pyro-compounds, empyreumatic resins and tarry ingredients which also have an unfavorable influence on the smell and color of the said oils.

Pine oils are made from the very resinous wood of the root of the pine by dry distillation and by succeeding rectification (comp. H. Blücher, *Auskunftsbuch für die Chemische Industrie*, III. Jahrgang, Wittenberg, verlag von Herrosé und Ziemsen, page 795). Pine-tar-oils and wood-tar-oils are made from the pine-tar and wood-tar respectively (comp. the above mentioned book, page 340).

The object of this process is on the one hand to reduce by means of zinc-dust the oils oxidized through the high temperature in the course of the dry distillation of the wood and, on the other, to eliminate the pyro-compounds, empyreumatic resins and tarry ingredients as zinc-compounds. If these impurities are not completely removed, there will show itself a yellow or yellow-brown color during the transformation of the turpentine-oils into resins. The disadvantage is avoided by washing the oil according to the present process. The acids contained in the raw-oil are bound by the zinc dust and eliminated. It is therefore not necessary to wash the raw-oils with lyes for removing the acids before the treatment with zinc-dust.

This process has the advantage over other known processes of being simpler and cheaper to carry out and the loss caused by the purification being smaller. By the purifying-processes now known the raw-oils receive a darker color by the treatment, so that at least two distillations are required to make them colorless, while according to the present process the raw-oils assume, in consequence of the treatment, a much lighter color, so that the product remains permanently colorless after one distillation; the pine oils are moreover distinguished by their pure turpentine smell.

In the accompanying drawing the device in connection with a condenser as used for this process is shown in a side elevation, partially in section.

In the practical carrying out of the process 1,000 kg. of pine-tar-oil are heated with 10 kg. of zinc-dust, for two hours, in a closed receptacle or still as $a$, up to about 100 C. During the heating process water contained in the oil evaporates and forces oil with it. Therefore the closed receptacle is connected with a condenser $b$ in which the vaporized parts of water and oil are condensed and flow back again into the receptacle through the connecting tube $d$. The chamber $b$, provided with a steam coil $k$, is filled with water of 60° to 70° C. The soil vaporized and not mixed with water passes through the tube $e$ into the cooling device $c$. The cooling water is supplied through the pipe $f$ and then rises successively through $c$, $g$, and the vessel surrounding the worm in $b$ to pass off by $h$. The pipe $e$ passes through the vessel $c$ to pass therefrom by a pipe $i$ in the lower right hand portion. After the cooling, the oil is carefully drawn off from the zinc-compounds at the bottom of the device $c$ into a washing-apparatus (not shown) provided with a stirring-gear and washed with warm, soft or slightly alkaline water until the water, when lye containing about thirty per cent. natrium hydroxid is added, does no longer turn yellow. Hereupon the oil is distilled by direct steam or over an open fire. The pine-oils are distilled by direct steam, while the wood-tar-oils are preferably distilled over an open fire, as this distillation is cheaper than the distillation by steam and its higher temperature does not cause any change of constitution of the ingredients of the wood-tar-oils, what would be the case with pine-oils.

In the process vegetable oils, *i. e.* products of the dry distillation of pine-wood as pine-oils, pine-tar-oils and wood-tar-oils consisting essentially of terpens are supposed to be purified. The most precious elements of these oils are not saturated combinations and are not affected nor altered by the purification according to this process.

Claim:

The process of purifying pine-oil, pine-tar-oil and wood-tar-oil by heating the same with zinc-dust for two hours in a closed receptacle provided with a condenser up to about 100° C. by cooling thereafter the oil, by drawing off the same into a washing apparatus provided with a stirring-gear, by washing it with water and by distilling the oil, substantially as specified.

In witness whereof I have hereunto set my hand in the presence of two witnesses.

OTTO PAUL PELLNITZ.

Witnesses:
FERDINAND REICH,
FRIEDRICH VON ESS.